US012805439B2

(12) United States Patent
Stephan

(10) Patent No.: US 12,805,439 B2
(45) Date of Patent: Nov. 24, 2026

(54) LAWN MOWER WASTE COLLECTION SYSTEM

(71) Applicant: Michael F. Stephan, Osceola, WI (US)

(72) Inventor: Michael F. Stephan, Osceola, WI (US)

( * ) Notice: Subject to any disclaimer, the term of this patent is extended or adjusted under 35 U.S.C. 154(b) by 392 days.

(21) Appl. No.: 18/381,492

(22) Filed: Oct. 18, 2023

(65) Prior Publication Data

US 2024/0122115 A1 Apr. 18, 2024

Related U.S. Application Data

(60) Provisional application No. 63/417,128, filed on Oct. 18, 2022.

(51) Int. Cl.
*A01D 43/063* (2006.01)
*A01D 43/06* (2006.01)

(52) U.S. Cl.
CPC ......... *A01D 43/0635* (2013.01); *A01D 43/06* (2013.01); *A01D 43/063* (2013.01); *A01D 43/0638* (2013.01)

(58) Field of Classification Search
CPC .. A01D 43/06; A01D 43/063; A01D 43/0635; A01D 43/0631; A01D 43/0638
See application file for complete search history.

(56) References Cited

U.S. PATENT DOCUMENTS

| | | | | |
|---|---|---|---|---|
| 4,897,013 | A * | 1/1990 | Thompson | A01D 87/0069 172/453 |
| 5,036,650 | A * | 8/1991 | Tesch | A01D 43/06 56/16.6 |
| 6,595,737 | B1 * | 7/2003 | Parish | A01D 43/0636 56/205 |
| 2006/0042214 | A1 * | 3/2006 | Asahara | A01D 43/063 56/202 |
| 2011/0011046 | A1 * | 1/2011 | Byard | A01D 34/71 56/14.5 |
| 2015/0230404 | A1 * | 8/2015 | Scheffler | A01D 43/0635 56/205 |
| 2019/0116732 | A1 * | 4/2019 | Tada | A01D 43/0638 |
| 2019/0380270 | A1 * | 12/2019 | Uemura | A01D 43/063 |
| 2021/0251143 | A1 * | 8/2021 | Gaeddert | A01D 43/0638 |

* cited by examiner

*Primary Examiner* — Brad Harcourt
(74) *Attorney, Agent, or Firm* — DeWitt LLP

(57) ABSTRACT

A collection system for a mower, including a collector, that has a mounting panel that is removably coupleable to the mower at a discharge of a mower deck and a collecting enclosure that is hingedly coupled to the mounting panel such that the mounting panel and the collecting enclosure together enclose a collecting volume that receives discharged matter. The collecting enclosure is shiftable about a hinge axis between a discharge collecting orientation in which the collecting enclosure abuts the mounting panel and is positioned to receive the discharged matter therein through an opening of the mounting panel and an emptying orientation in which the collecting enclosure is raised by rotation about the hinge axis such that the discharged material exits the enclosure by gravity.

11 Claims, 15 Drawing Sheets

LAWN MOWER WASTE COLLECTION SYSTEM

RELATED APPLICATIONS

This application claims the benefit of U.S. Provisional Application No. 63/419,128, filed Oct. 18, 2022, the entire content of the above application being incorporated herein by reference in its entirety.

TECHNICAL FIELD

The invention generally relates to mowing of grass and other vegetation using heavy commercial mowers. More particularly, the invention relates to a waste collection, stowage, and disposal system for attachment to such a mower.

BACKGROUND

For high-volume commercial mowers, a tension exists between the speed at which a volume of vegetation may be cut and the difficulty of collecting, stowing, and disposing of this volume. At a high-volume rate, an operator may need to frequently return to a disposal site to offload mowed or otherwise collected vegetation from an onboard collector. For safety reasons, the mower may need to be shut down while the operator manually detaches and empties the collector. This increases mowing time and wastes fuel. If a user affixes a larger volume collector to the mower, the collector may become so heavy as to be difficult to remove and empty manually, leading to potential damage to the mower or injury to the operator. A towed or otherwise self-supporting collector may be difficult to maneuver, especially on sloping or otherwise uneven ground, and prohibitively complicated, expensive, and bulky, especially for a small business. A towed collector increases the difficulty of moving the mower in reverse due to the tendency of a trailer to jackknife when reversed.

Accordingly, there is still room for improvement in the art of collecting, stowing, and disposing of mowed vegetation.

BRIEF DESCRIPTION OF THE DRAWINGS

Subject matter hereof may be more completely understood in consideration of the following detailed description of various embodiments in connection with the accompanying figures, in which.

Figure 1A:
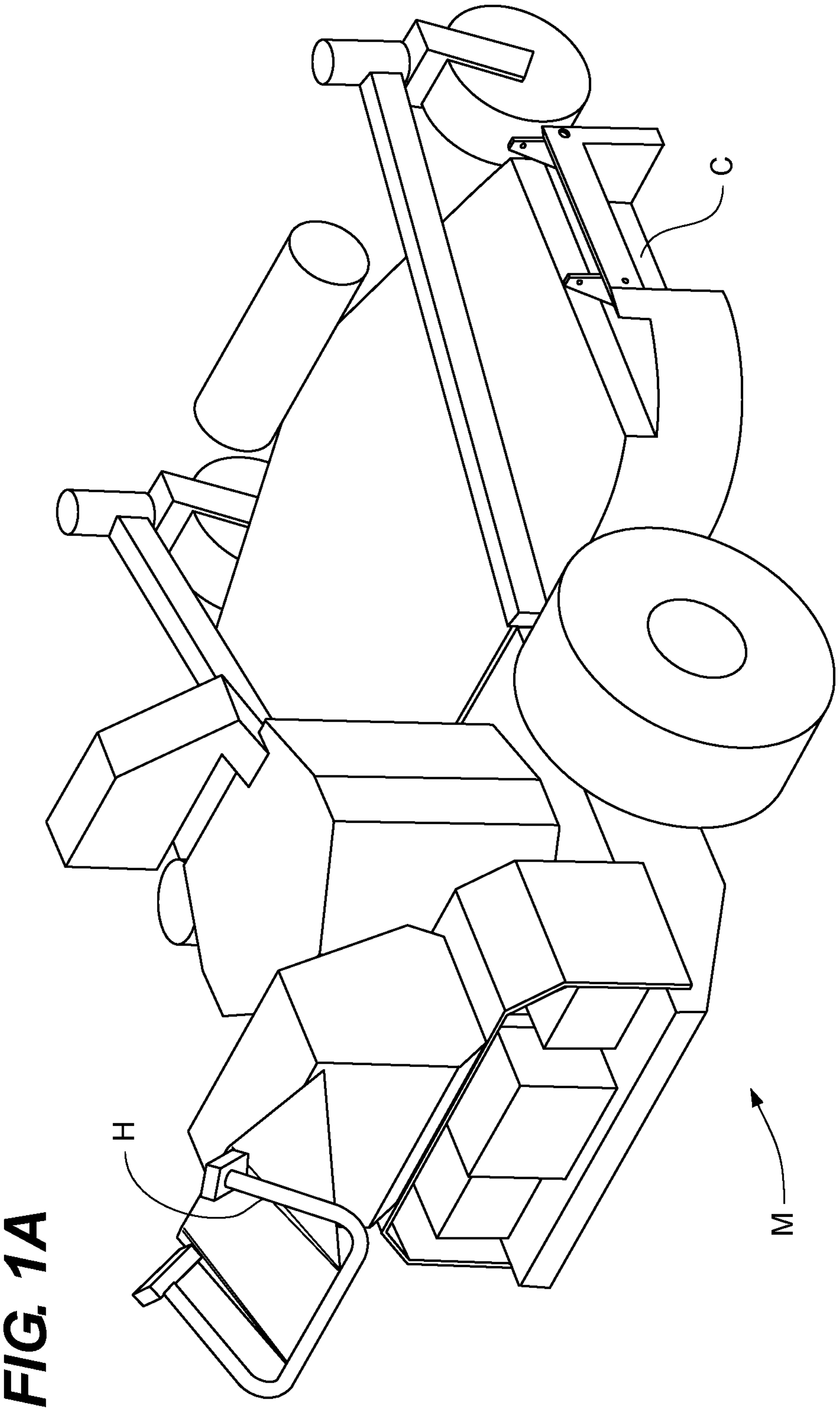
FIGS. 1A, 1B, and 1C are schematic perspective rear, right side, and top views, respectively, of an example mower that can be used with an example embodiment of the invention.

While various embodiments are amenable to various modifications and alternative forms, specifics thereof have been shown by way of example in the drawings and will be described in detail. It should be understood, however, that the intention is not to limit the claimed inventions to the particular embodiments described. On the contrary, the intention is to cover all modifications, equivalents, and alternatives falling within the spirit and scope of the subject matter as defined by the claims.

DETAILED DESCRIPTION

Figure 1B:
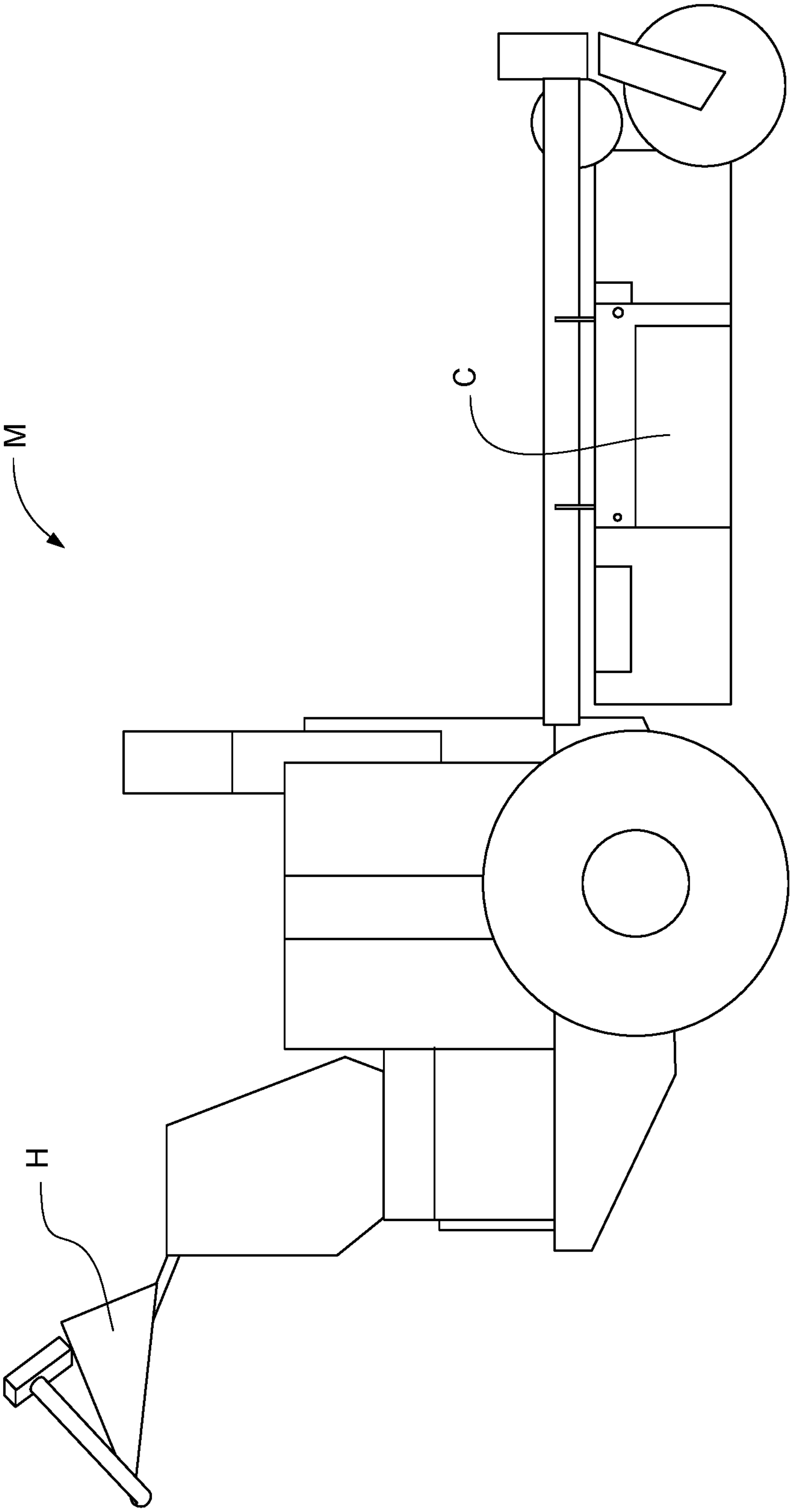
Figure 1C:
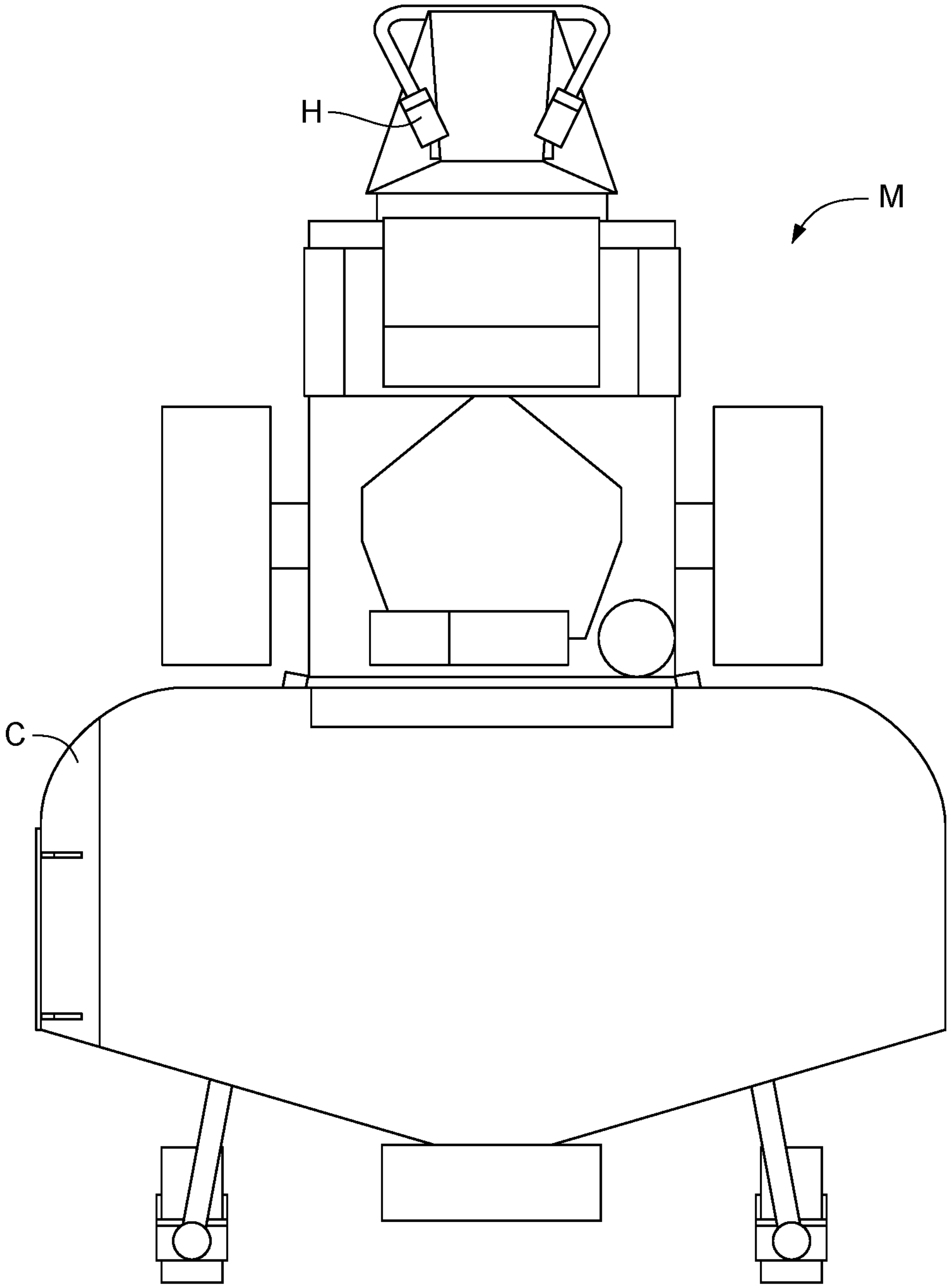
Figure 2A:
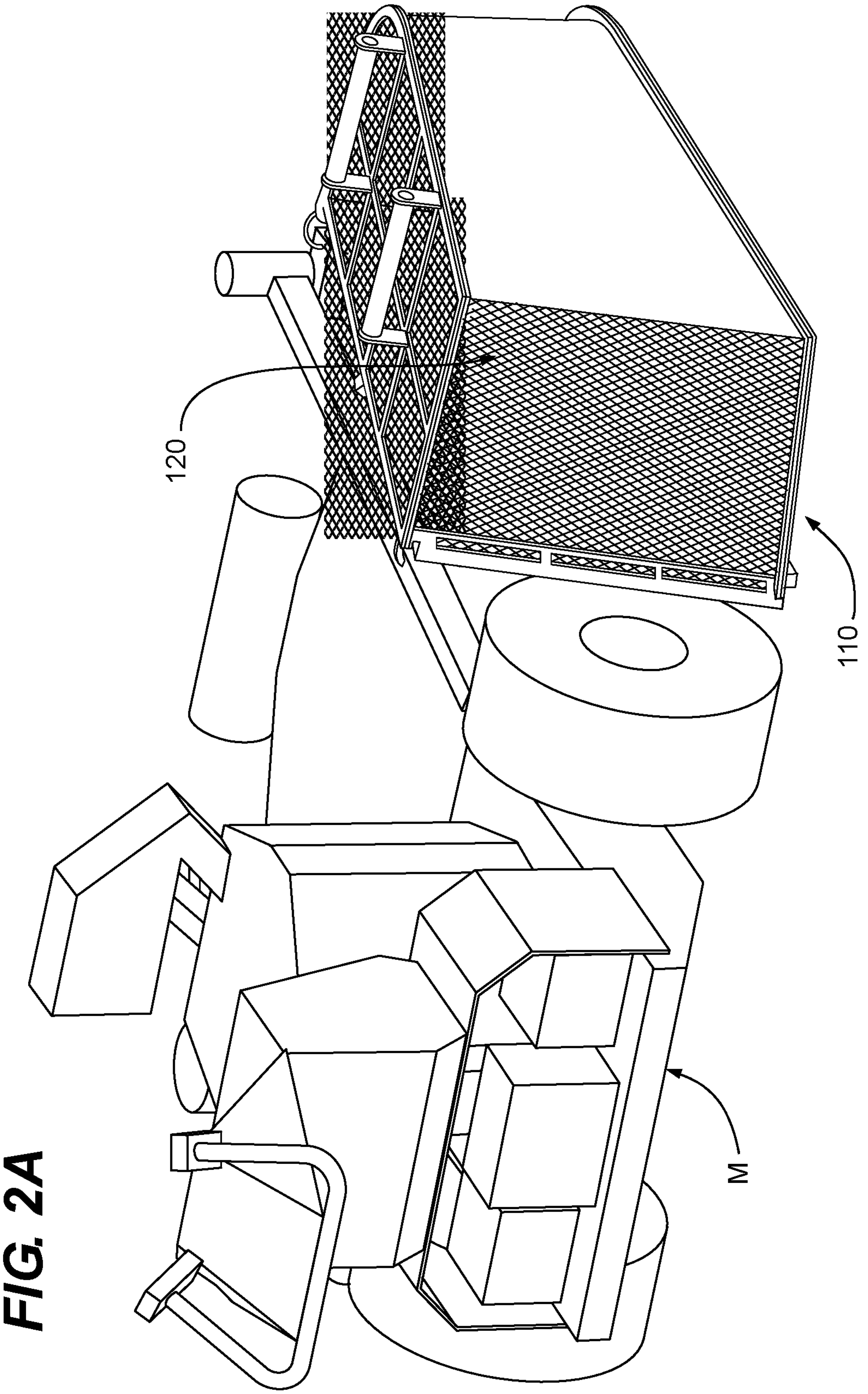
FIGS. 2A, 2B, 2C, 2D, 2E, 2F, 2G, and 2H are perspective rear unactuated, perspective rear actuated, rear unactuated, rear actuated, right side unactuated, right side actuated, top unactuated, and top actuated views, respectively, of a mower depicting features of an example embodiment of the invention depicting the invention in an unactuated collecting orientation and in an actuated emptying orientation.
Figure 2B:
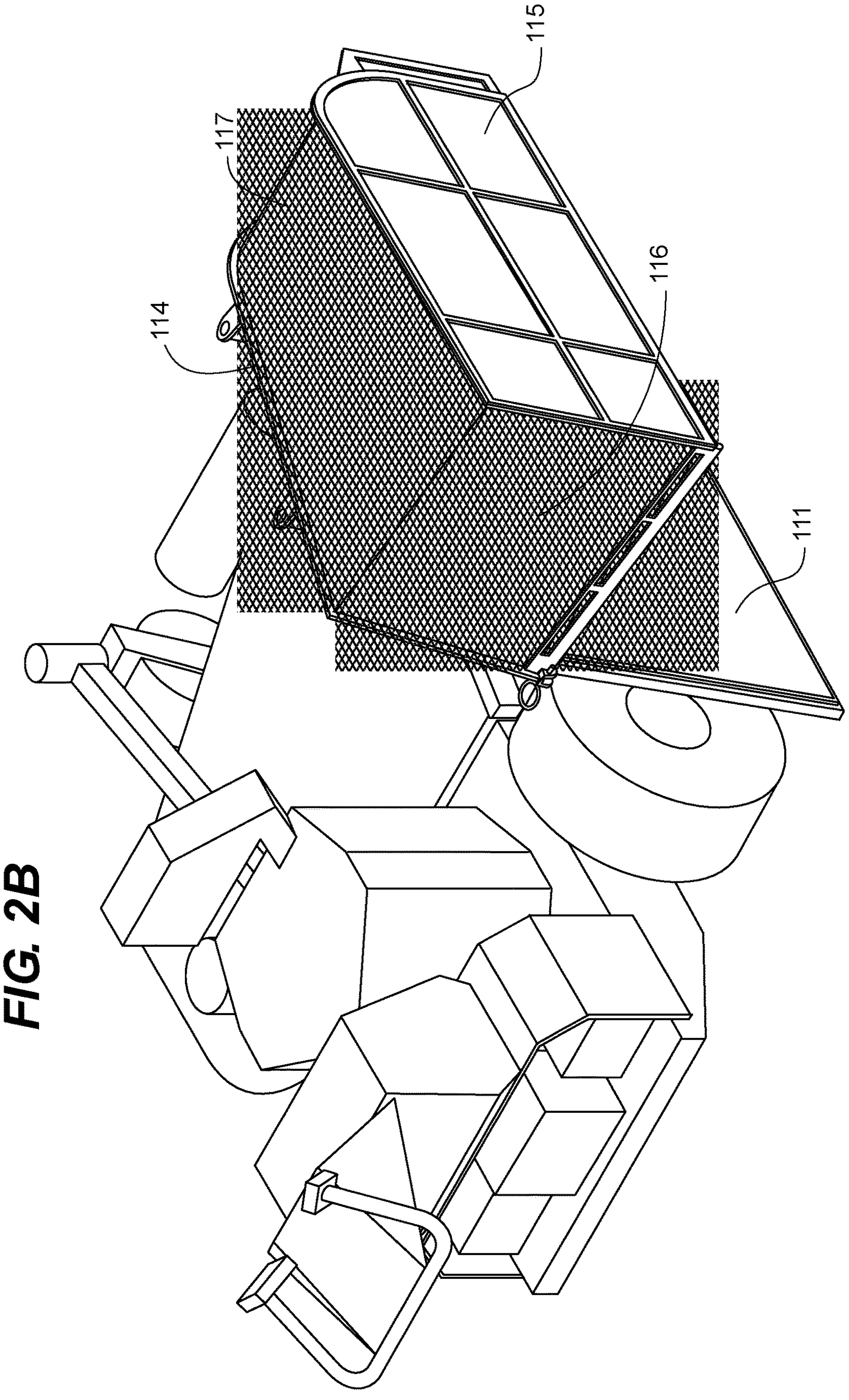
Figure 2C:
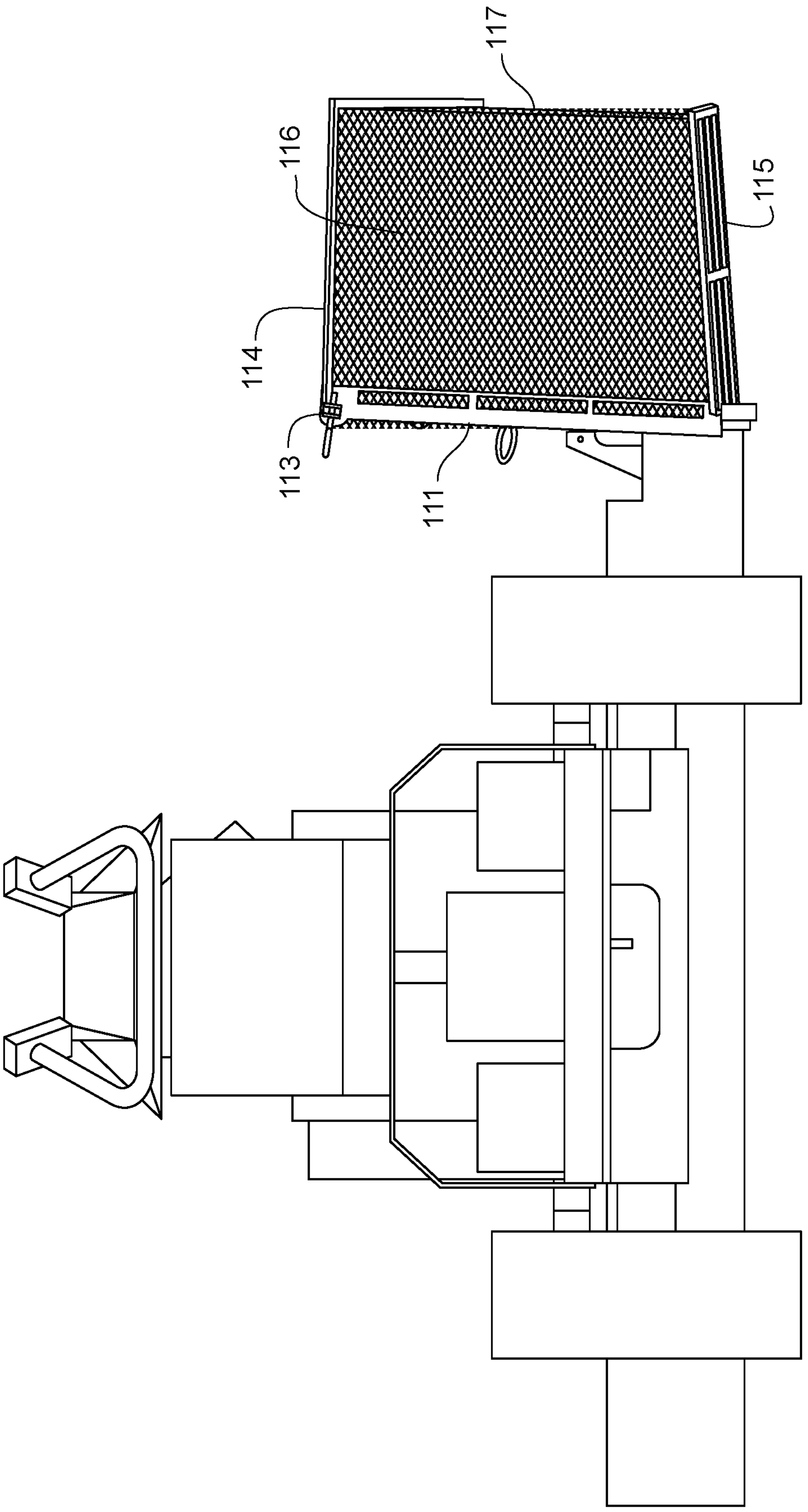
Figure 2D:
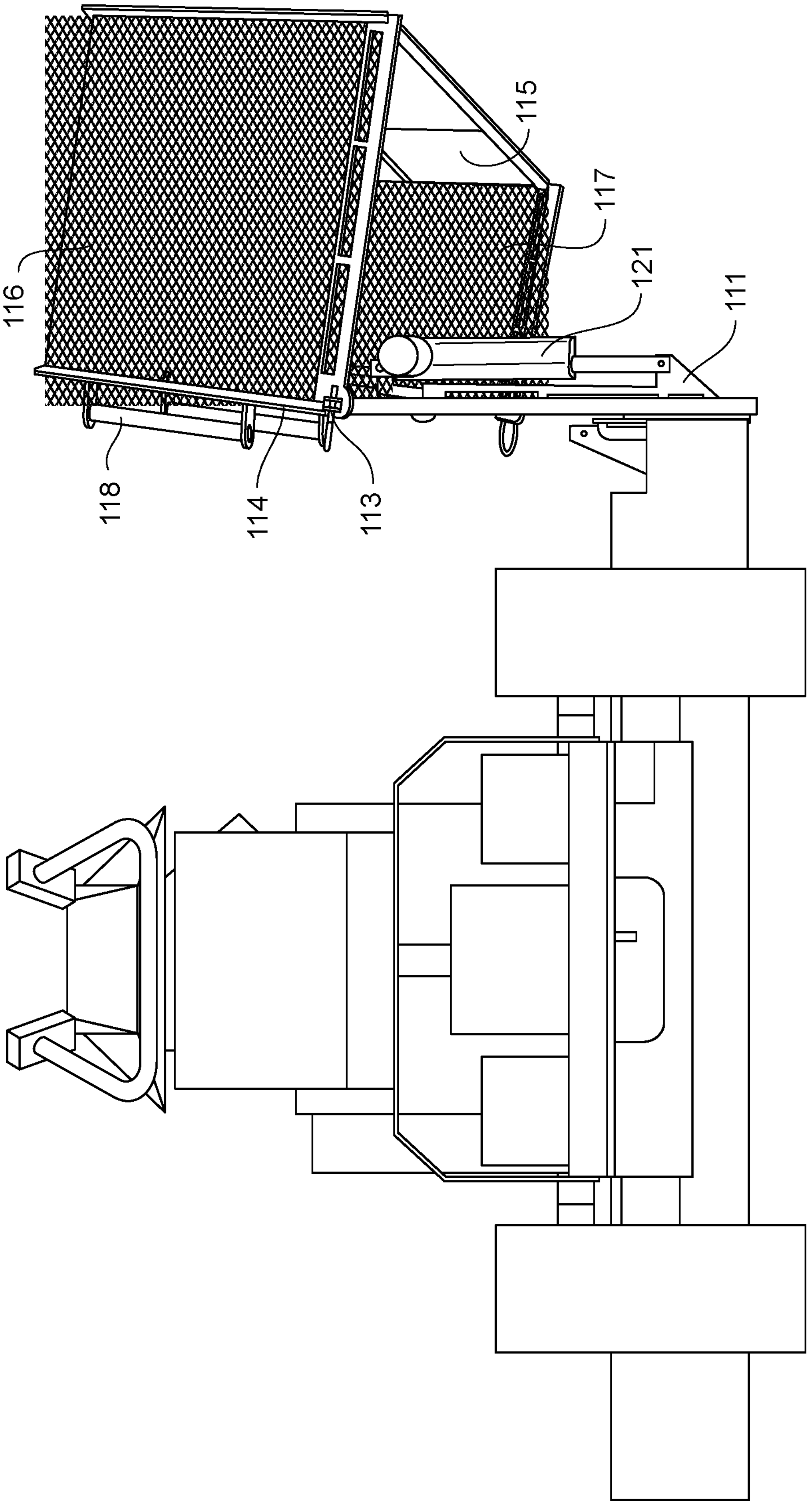
Figure 2E:
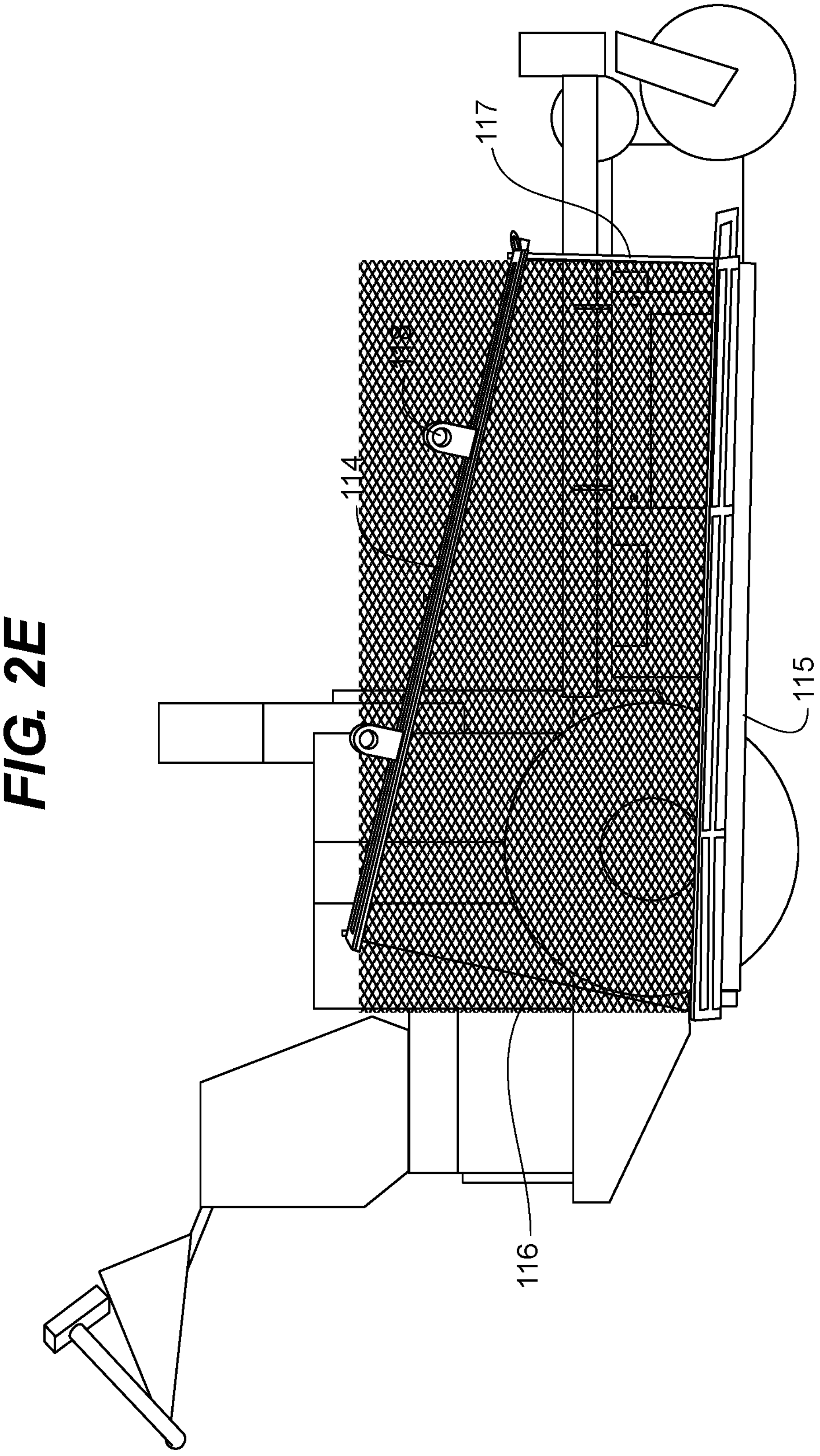
Figure 2F:
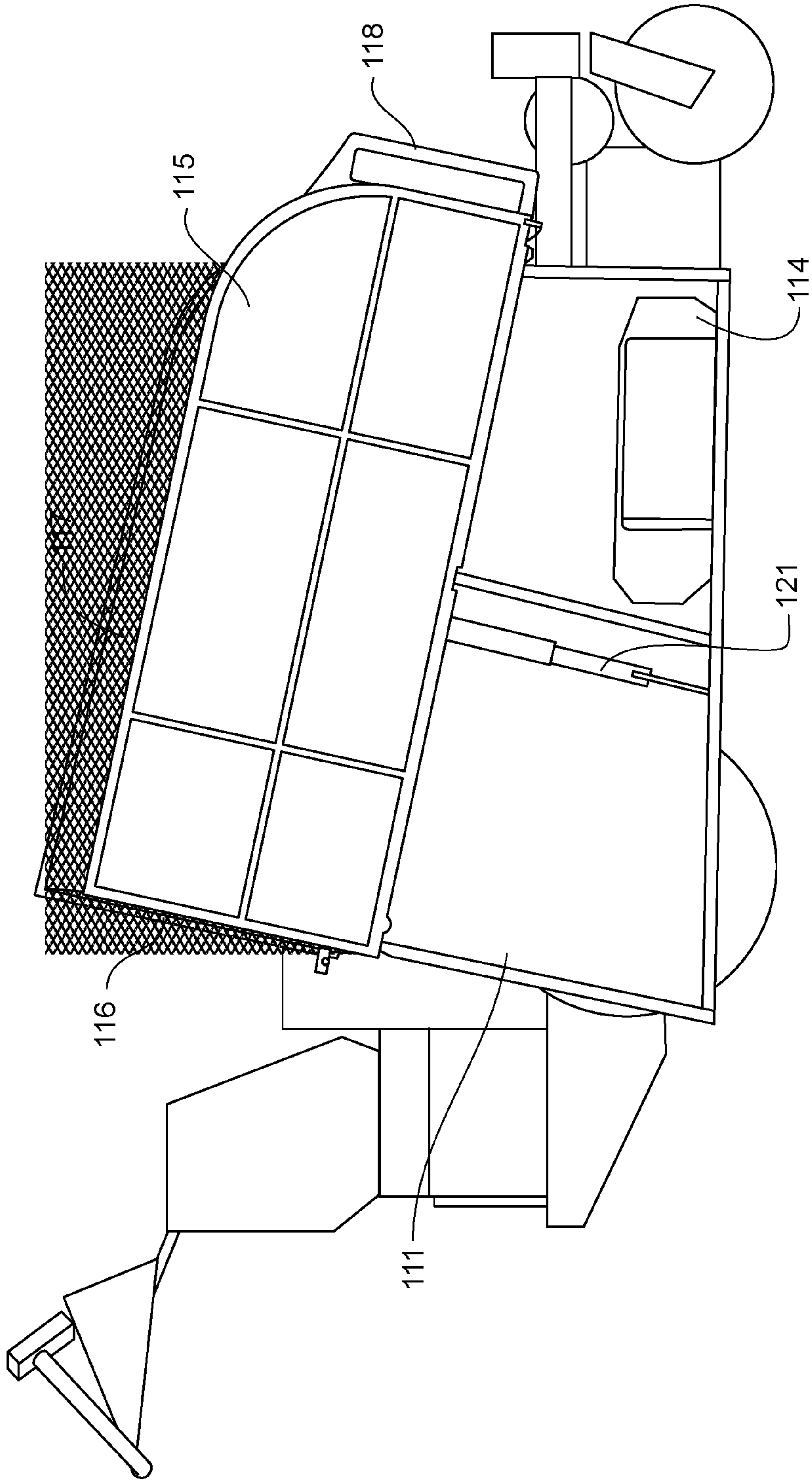
Figure 2G:
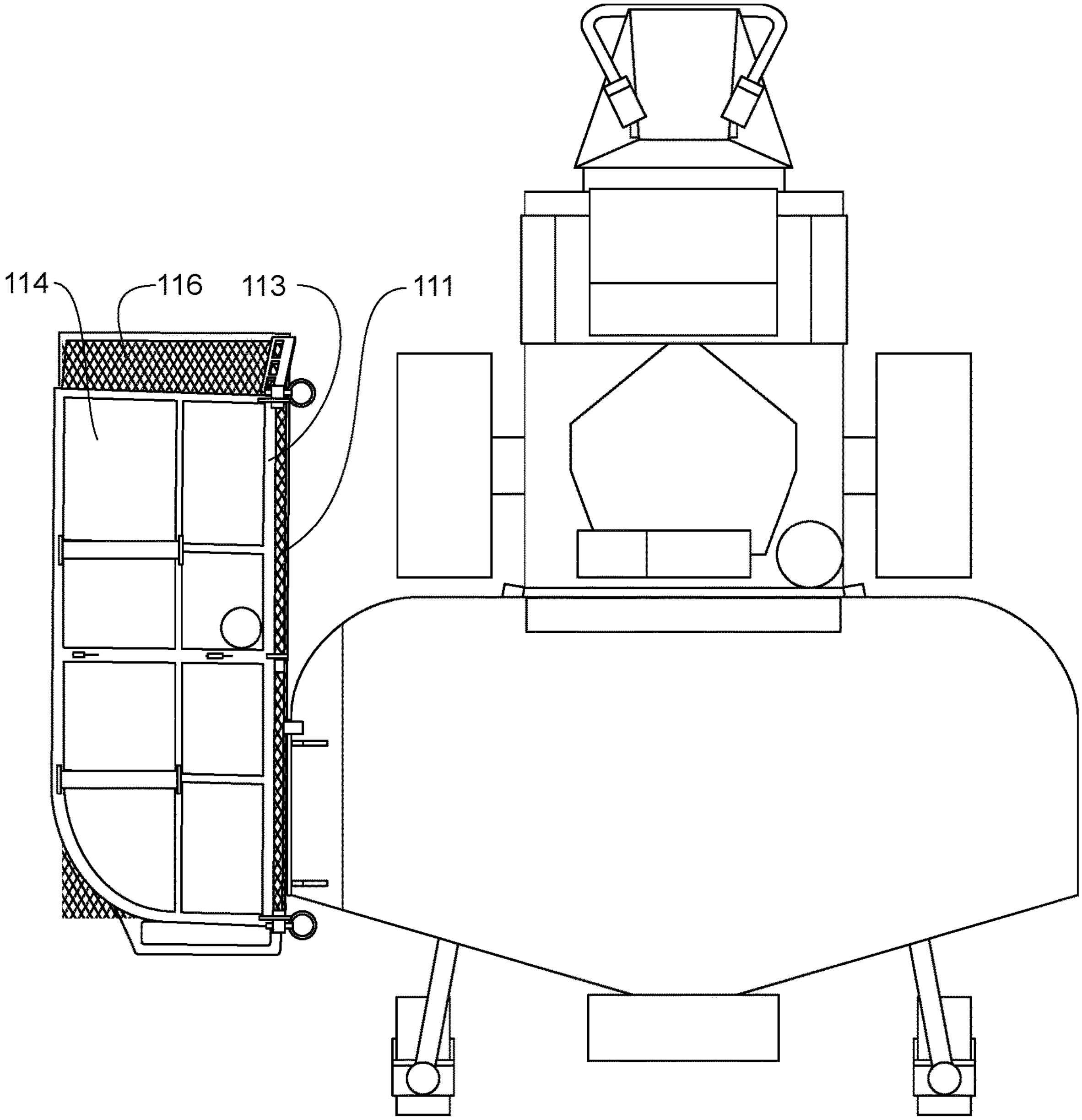
Figure 2H:
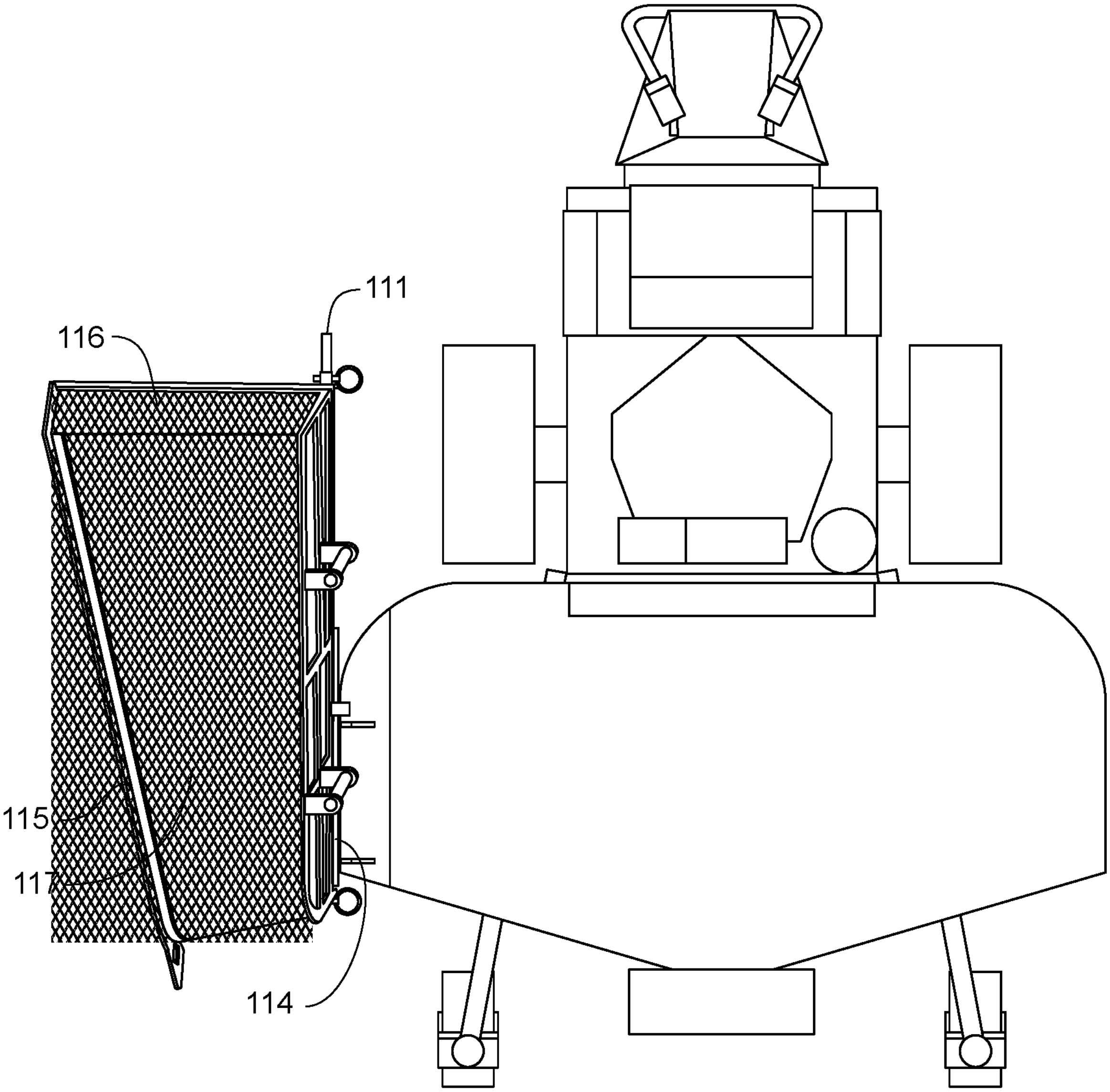
Figure 3A:
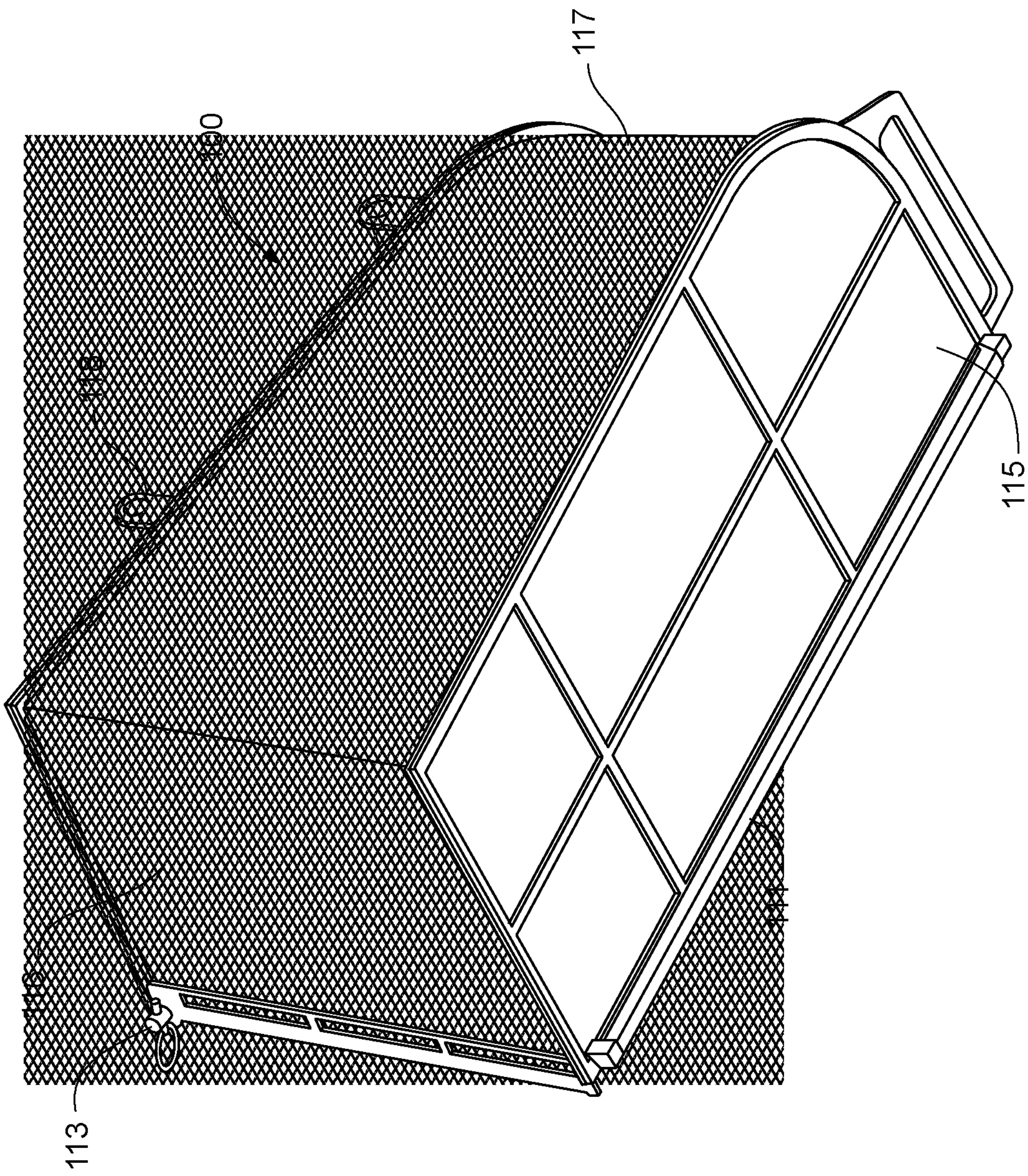
FIGS. 3A, 3B, and 3C are perspective bottom unactuated, perspective bottom actuated, and rear bottom actuated views, respectively, of the invention as depicted in FIGS. 2A through 2H.
Figure 3B:
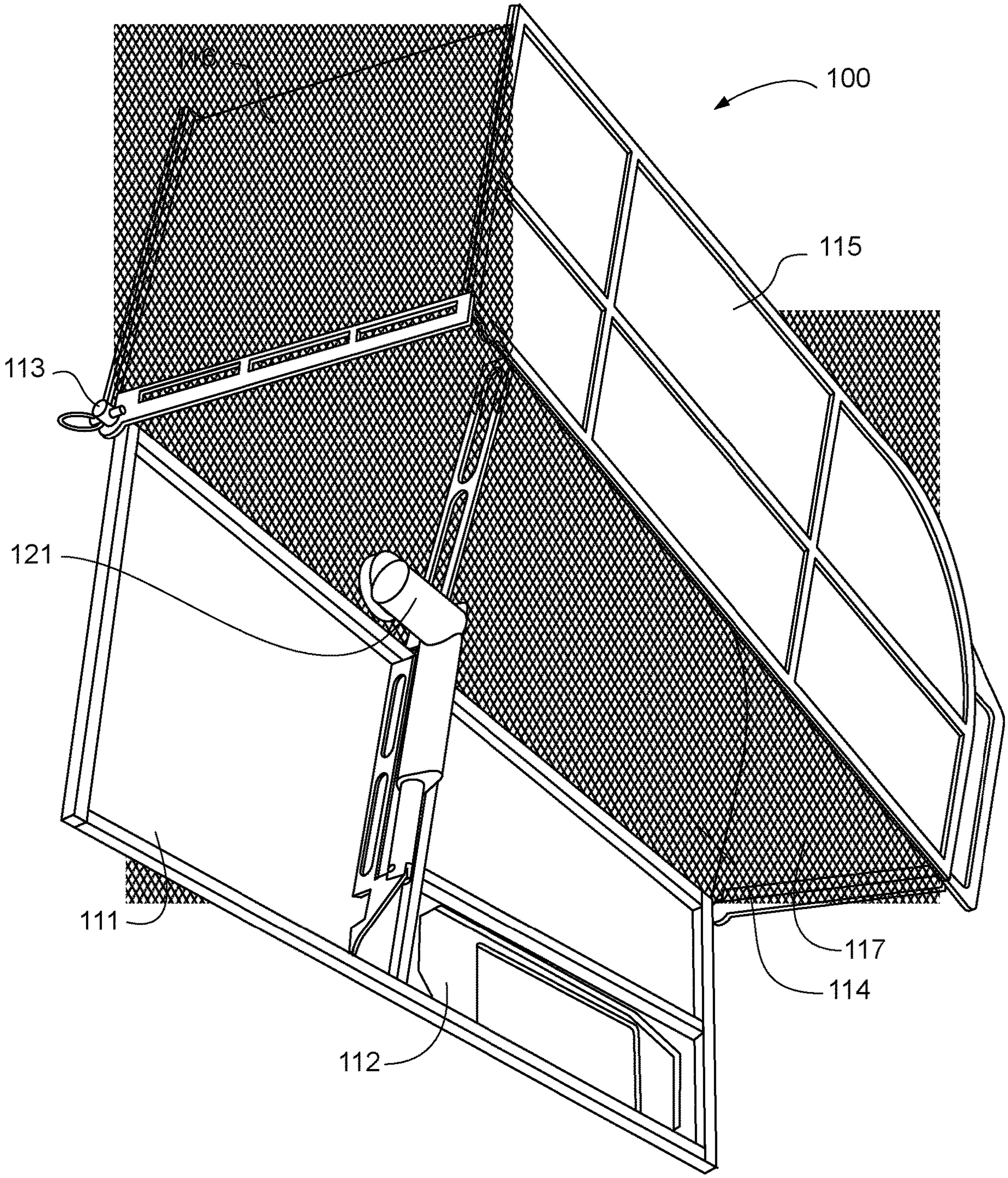
Figure 3C:
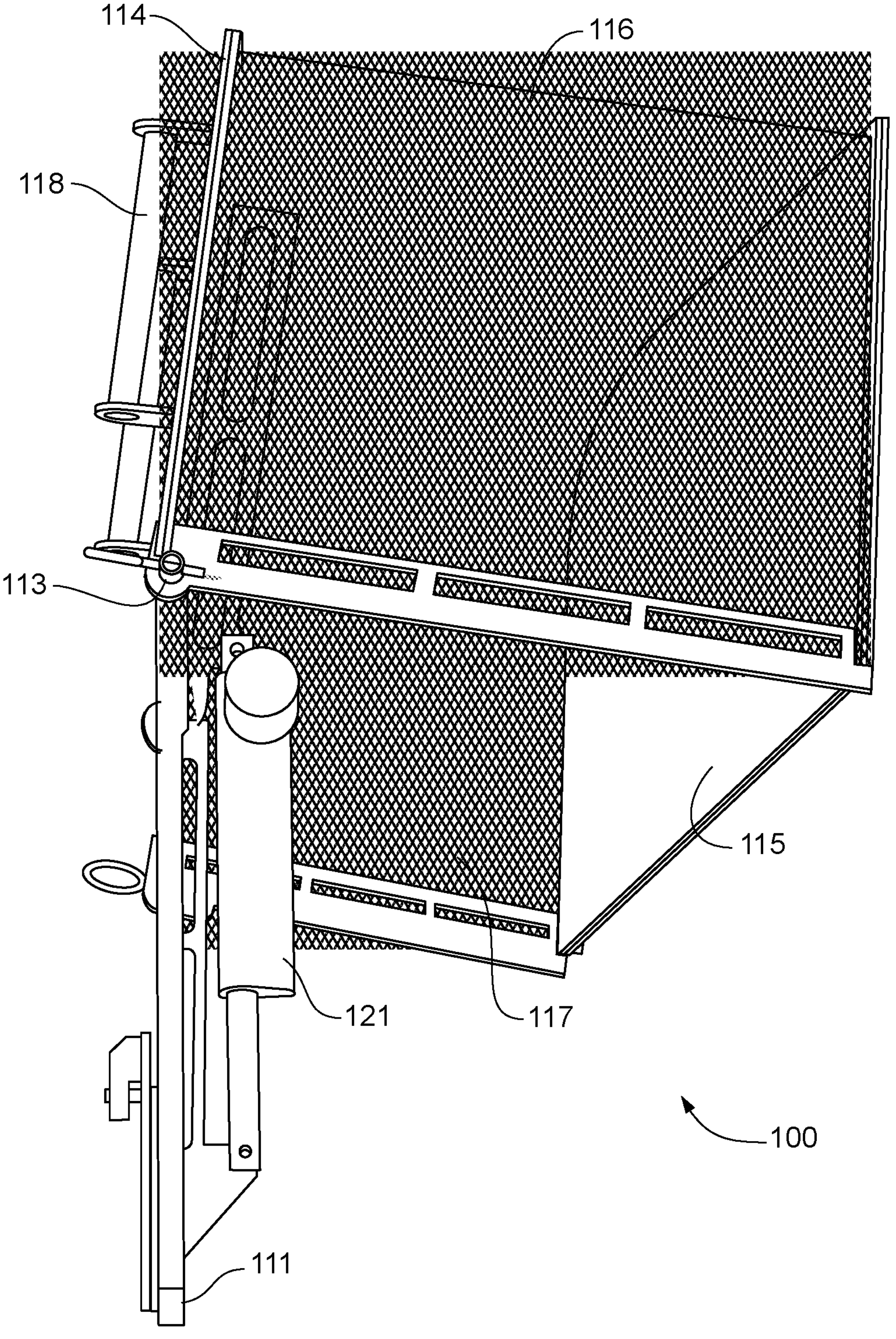
Figure 4:
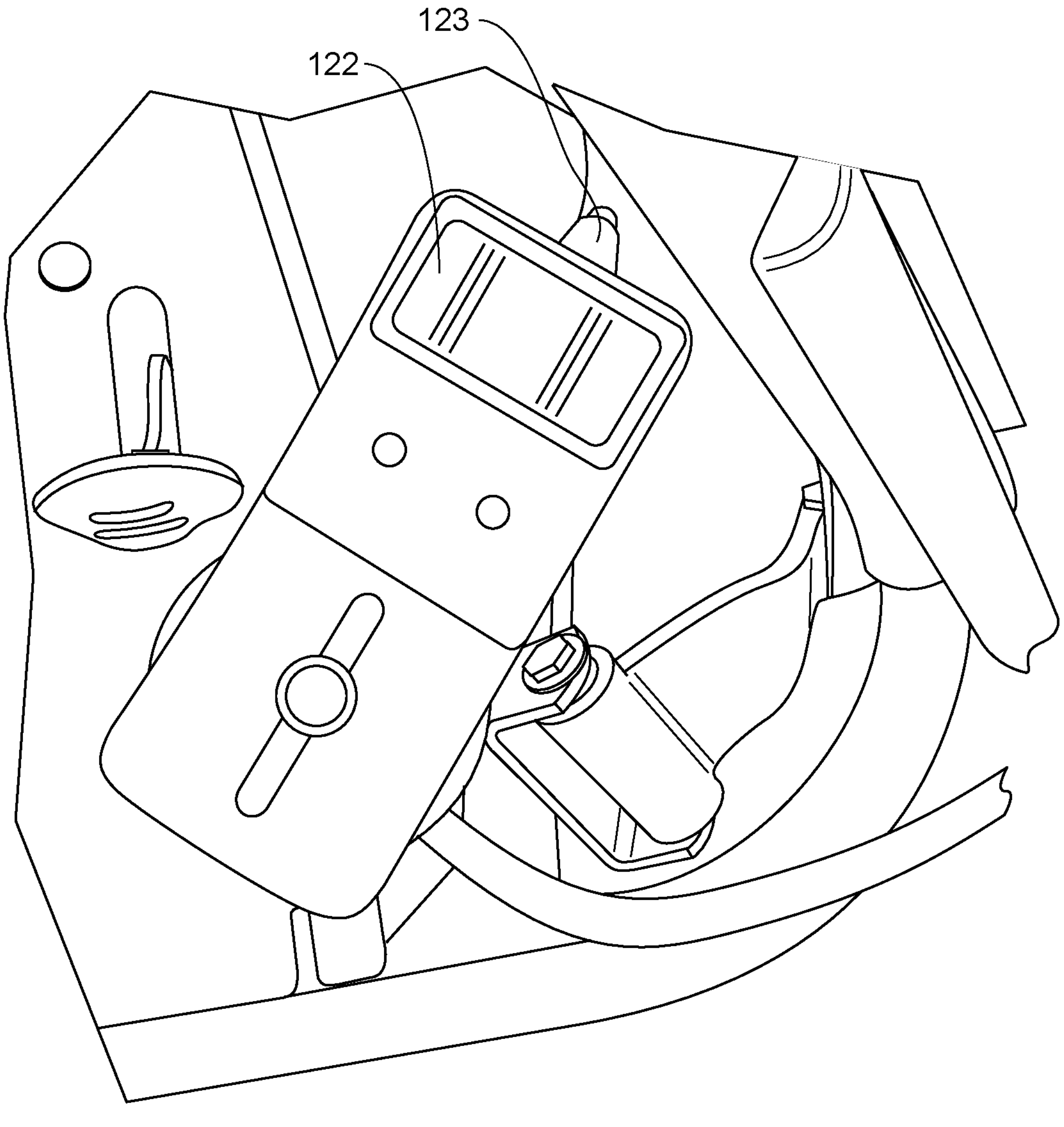
FIG. 4 is a partial perspective rear view of an operator's position of a mower equipped with an example embodiment of the invention as depicted in FIGS. 2A through 2H including an actuating control.

Referring to FIGS. 1, example embodiments of the invention are utilized for example with a commercial stand-on or walk behind mower M.

The collection system 100 is depicted in FIGS. 2A-2H, 3A-3C and 4. The collection system 100 according to an example embodiment of the invention removably mounts to the mower M proximate collection chute C using conventional means. During an example operation of the mower M, grass cut by the mower M is blown through collection chute C and into an interior volume of a collector 110. When the volume of grass filling the collector 110 becomes sufficiently high, the operator may trigger an actuation assembly 120 to rotate and raise part of the collector 110, allowing the grass to exit collector 110 by gravity. While this application makes reference to "grass" throughout, it should be understood that the term "grass" should be taken to include any material capable of being collected by a mower, such as, but not limited to, grass, leaves, stems, branches, nuts, and garbage.

The collector 110 is a container with an interior volume formed between a mounting panel 111, a top panel 114, a bottom panel 115, a rear panel 116, and at least one side panel 117. The collector 110 of the example embodiment is of a welded steel construction, with at least the top panel 114, bottom panel 115, and side panel 117 being permanently joined together. In other embodiments, the collector 110 is constructed from aluminum, steel, plastic, or any combination, and may be constructed using molding, machining, welding, or any combination thereof. The mounting panel 111 is rotatably connected to the top panel 114 by at least one hinge 113. At least one of the mounting panel 111, top panel 114, bottom panel 115, rear panel 116, and side panel 117 is formed with a pierced or screen-like configuration to allow egress of air and lighten the overall weight of the collector 110.

In the depicted example embodiment, the mounting panel 111 extends vertically between the top panel 114 and the bottom panel 115, and horizontally between the side panel 117 and the rear panel 116. The mounting panel 111 is rotatably connected to the top panel 114 by at least one hinge 113 defining a hinge axis. The example embodiment utilizes three hinges 113, all of which are pin-and-barrel hinges, though other hinge configurations are contemplated. The axis of the hinge 113 extends generally parallel to an upper edge of the mounting panel 111. The mounting panel 111 is configured to be removably mounted to the mower M. A chute aperture 112 extends through the mounting panel 111 to allow a flow of air and mown grass from the collection chute C to the interior of the collector 110. The chute aperture 112 has a circumference and area at least as large as the circumference and area of the collection chute C of mower M to prevent grass buildup and blockage and allow free flow of discharged material.

In the depicted example embodiment, the top panel 114 is located above the bottom panel 115 and extends backwards at an upward angle relative to the bottom panel 115. At least one collector handle 118 may extend from the top panel 114 for an operator to grip to facilitate moving or installing the collector 110.

In the depicted example embodiment, the bottom panel 115 is approximately parallel to the ground and level with the deck of the mower M to ensure proper ground clearance. At least one collector handle 118 may extend from the bottom panel 115 for an operator to grip to facilitate moving or installing the collector 110.

In the depicted example embodiment, the rear panel 116 extends between the top panel 114 and the bottom panel 115, and horizontally between the mounting panel 111 and the side panel 117. In the example embodiment, the rear panel 116 is permanently connected to the top panel 114, bottom panel 115, and side panel 117. In certain embodiments, rear panel 116 is also connected to at least one of the top panel 114, bottom panel 115, and side panel 117 by at least one hinge 113. In certain embodiments, rear panel 116 is removably connected to at least one of the top panel 114, bottom panel 115, and side panel 117.

In the depicted example embodiment, the side panel 117 extends vertically between the top panel 114 and the bottom panel 115, and horizontally between the mounting panel 111 and the rear panel 116. In the example embodiment, the side panel 117 has an L-shaped configuration when observed from the top, with one leg opposite the rear panel 116 and the other leg opposite the mounting panel 111. In the example embodiment, the side panel 117 has a curved bend between legs. Other embodiments may be a single piece bent at an up to 90-degree angle or may be formed from a connection of two side panels 117 at for example a 90 degree angle.

The actuation assembly 120 couples the mower M and the collector 110. Actuator 121 is mounted extending between the mounting panel 111 and top panel 114, with an actuator control 122 mounted to the mower M within easy reach of an operator's position. An actuator line 123 extends between the actuator control 122 and the linear actuator 121 to transmit an actuation signal to either the linear actuator 121 or a power source 124 when the actuator control 122 is triggered. The power source 124 is operably connected to at least the linear actuator 121 to provide power to the linear actuator 121.

In the depicted example embodiment, the linear actuator 121 is an electric screw jack actuator; other embodiments may include for example other electric, pneumatic, or hydraulic actuators.

In the depicted example embodiment, the linear actuator 121 is mounted between the mounting panel 111 and top panel 114, with a first end mounted to the mounting panel 111 and a second end rotatably mounted to the top panel 114. When actuated, extension of the linear actuator 121 results in the combination of the top panel 114, bottom panel 115, rear panel 116, and side panel 117 rotating about the axis of the hinge 113. This creates an expanding gap separating the bottom panel 115, rear panel 116, and side panel 117 from the mounting panel 111. Grass contained in the interior volume of the collector 110 will then fall out through the gap by force of gravity. As the linear actuator 121 continues to extend, the combination of the top panel 114, bottom panel 115, rear panel 116, and side panel 117 continues to rotate until the gap is at least 30 degrees from vertical to ensure complete emptying. This may be of particular importance if the grass is wet. In certain embodiments, the angle of the gap may be larger, up to 180 degrees, to allow for more complete emptying or for the operator to inspect or manually clear the collector 110 if needed.

In the depicted example embodiment, the actuator control 122 is a rocker switch mounted to the mower handle H, allowing an operator to empty the collector 110 while remaining in control of the mower M; in other embodiments, the actuator control 122 is a button or other type of switch. In the depicted example embodiment, the actuator control 122 is a rocker switch having a neutral position and two opposing operation positions that operate linear actuator 121 in opposing directions. In the depicted example embodiment, the actuator control 122 is removably mounted; in other embodiments, the actuator control 122 is permanently mounted. In the example embodiment, the actuator control 122 is mounted via magnetic mount; in other embodiments, the actuator control 122 is mounted via interlock or anchor. In the example embodiment, triggering the actuator control 122 provides a signal to either the linear actuator 121 or the power source 124. The signal causes the power source 124 to provide power to the linear actuator 121 for extension or retraction.

In the depicted example embodiment, the power source 124 is a battery separate from any power system of the mower M. In other embodiments, the power source 124 is a part of the mower M, such as, but not limited to, the mower starting battery.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

It should be understood that any claims listed in the provisional application to which priority is claimed are exemplary only, and that no limitation on any subsequent application is intended or should be implied from this exemplary listing of claims.

The invention claimed is:

1. A collection system for a mower, comprising:

a collector, comprising:

a mounting panel that is removably coupleable to the mower at a discharge of a mower deck, the mounting panel defining an opening that engages proximate the discharge of the mower deck thereby facilitating passage of discharged matter through the opening;

a collecting enclosure that is hingedly coupled to the mounting panel adjacent the discharge of the mower deck, such that the mounting panel and the collecting enclosure together enclose a collecting volume that receives the discharged matter directly from the discharge of the mower deck through the opening and into the collecting volume, the collecting enclosure being shiftable about a hinge axis between a discharge collecting orientation in which the collecting enclosure abuts the mounting panel and is positioned to receive the discharged matter therein through the opening of the mounting panel and an emptying orientation in which the collecting enclosure is raised by rotation about the hinge axis such that the discharged material exits the enclosure by gravity; and an actuation assembly, comprising:

a power actuator connected to and between the mounting panel and a portion of the collecting enclosure;

an actuation control operably connected to the power actuator and accessible from an operator's position, wherein operating the power actuator in a first direction urges the collecting enclosure toward the emptying orientation and operating the power actuator in a second direction urges the collecting enclosure toward the collecting orientation wherein the power actuator comprises:

a linear actuator connected to and extending between the mounting panel and an upper portion of an interior of the collecting enclosure;

wherein activating the actuation control in a first configuration causes the linear actuator to extend and activating the actuation control in a second configuration causes the linear actuator to contract, and wherein extending the linear actuator urges the collecting enclosure toward the emptying orientation and contracting the linear actuator urges the collecting enclosure toward the collecting orientation.

2. The collection system as claimed in claim 1, wherein the collecting enclosure includes a top panel and the top panel is rotatably connected to the mounting panel by at least one hinge.

3. The collection system as claimed in claim 1, wherein the opening in the mounting panel further comprises a chute aperture extending therethrough.

4. The collection system as claimed in claim 1, wherein the power actuator is an electric actuator.

5. The collection system as claimed in claim 4, wherein the power actuator comprises a screw jack electric actuator.

6. The collection system as claimed in claim 1, wherein the actuation control comprises a switch.

7. The collection system as claimed in claim 6, wherein the actuation control comprises a rocker switch.

8. A method of collecting and dumping discharged matter from a mower, comprising:

removably coupling a mounting panel to the mower at a discharge of a mower deck, such that an opening of the mounting panel engages proximate the discharge of the mower deck thereby facilitating passage of discharged matter through the opening;

coupling a collecting enclosure that is hingedly coupled to the mounting panel adjacent the discharge of the mower deck, such that the mounting panel and the collecting enclosure together enclose a collecting volume that receives the discharged matter directly from the discharge of the mower deck through the opening and into the collecting volume, the collecting enclosure being shiftable about a hinge axis between a discharge collecting orientation in which the collecting enclosure abuts the mounting panel and is positioned to receive the discharged matter therein through the opening of the mounting panel and an emptying orientation in which the collecting enclosure is raised by rotation about the hinge axis such that the discharged material exits the enclosure by gravity;

operating the mower until the collecting enclosure is at least partially full;

operating a power actuator connected to and between the mounting panel and a portion of the collecting enclosure by operation of an actuation control operably connected to the power actuator and accessible from an operator's position;

operating the power actuator in a first direction to urge the collecting enclosure toward the emptying orientation thereby dumping the discharged matter from the collecting enclosure and operating the power actuator in a second direction to urge the collecting enclosure toward the collecting orientation coupling a linear actuator as the power actuator connected to and extending between the mounting panel and an upper portion of an interior of the collecting enclosure;

activating the actuation control in a first configuration causing the linear actuator to extend and activating the actuation control in a second configuration causing the linear actuator to contract; and extending the linear actuator to urge the collecting enclosure toward the emptying orientation and contracting the linear actuator to urge the collecting enclosure toward the collecting orientation.

9. The method as claimed in claim 8, further comprising rotatably connecting the collecting enclosure via a top panel to the mounting panel by at least one hinge.

10. The method as claimed in claim 8, further comprising making or selecting the power actuator to comprise an electric actuator.

11. The method as claimed in claim 8, further comprising making or selecting the power actuator to comprise a screw jack electric actuator.

* * * * *